United States Patent Office 3,510,483
Patented May 5, 1970

3,510,483
SUBSTITUTED 1,4,5,6-TETRAHYDRO-as-TRIAZINE METHOHALIDES
Donald L. Trepanier, Indianapolis, Ind., assignor to The Dow Chemical Company, Midland, Mich., a corporation of Delaware
No Drawing. Filed Aug. 8, 1967, Ser. No. 659,006
The portion of the term of the patent subsequent to Feb. 18, 1986, has been disclaimed and dedicated to the Public
Int. Cl. C07d 55/10
U.S. Cl. 260—248                    2 Claims

ABSTRACT OF THE DISCLOSURE 1,3,5,6-substituted-1,4,5,6-tetrahydro-as-triazine methoiodides and methobromides which are useful as insecticides and herbicides, and as fungicides in certain cases.

CROSS-REFERENCE TO RELATED APPLICATION

Starting materials useful in the preparation of the compounds of the invention are disclosed and claimed in my copending joint application with Guy H. Harris, Ser. No. 598,977, filed Dec. 5, 1966, now U.S. Patent No. 3,428,635.

SUMMARY OF THE INVENTION

This invention is directed to novel as-triazine methohalides and is particularly directed to the methohalides of substituted 1,4,5,6-tetrahydro-as-triazines corresponding to the formula

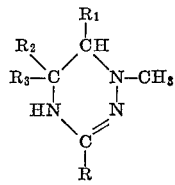

wherein R represents alkyl groups containing 1, to 2, to 3, to 4 carbon atoms, pyridyl, phenyl or substituted phenyl, $R_1$ represents hydrogen or methyl, $R_2$ represents hydrogen or methyl and $R_3$ represents hydrogen, phenyl or methyl. The term "substituted phenyl" includes phenyl groups substituted with from 1, to 2, to 3 substituents. Suitable substituents include bromine, chlorine, fluorine, trifluoromethyl and lower alkyl and lower alkoxy groups containing from 1 to 4 carbon atoms, inclusive. The term "halide," as employed herein, refers to bromide and iodide and the term "methohalide" is intended to include the methoiodides and the methobromides, as well as the dimethobromides and dimethoiodides of the compounds corresponding to the above formula wherein R is pyridyl.

The novel compounds are crystalline solids which are soluble in a variety of organic solvents such as acetone, alcohols and chloroform and only slightly soluble in water and ether. The novel triazine methohalide compounds have been found to be useful as herbicides and insecticides and as fungicides in certain cases. One of the novel compounds, 1,6 - dimethyl-3-(4-methylphenyl)-5-phenyl-1,4,5,6-tetrahydro-as-triazine methoiodide, was found to give good control of dermatophytoses produced with Candida albicans in laboratory animals when administered to the animals per os.

DESCRIPTION OF PREFERRED EMBODIMENTS

The new compounds of the present invention are prepared by reacting methyl iodide or methyl bromide with a substituted 1,4,5,6-tetrahydro-as-triazine corresponding to the above formula. The reaction is conveniently carried out in an inert organic solvent as a reaction medium and proceeds readily at temperatures of from 20° to 180° C., and is conveniently carried out at the boiling temperature of the reaction mixture. The proportions of the reactants to be employed are not critical, some of the desired products being obtained when combining the reactants in any proportions. When R is pyridyl, the reaction consumes two molar proportions of the methyl halide for every molar proportion of substituted 1,4,5,6-tetrahydro-as-triazine. In all other cases, the reaction consumes the reactants in equimolar proportions. In both cases, the use of an excess of the methyl halide is preferred.

In carrying out the preparation of the 1,4,5,6-tetrahydro-as-triazine methobromide and methoiodide compounds of the present invention, the reactants and the inert reaction medium are mixed together in any order or fashoin. Representative inert organic liquid reaction media include acetone, methanol, ether and ethanol. During and after the mixing of the reactants, the reaction mixture is heated at a temperature within the reaction temperature range for a period of time of from about one hour to about 18 hours. In a convenient procedure, the reaction mixture is heated at the boiling temperature and under reflux for a short time. In those cases in which the product precipitates in the reaction mixture as a solid material, it can be separated by such conventional procedures as filtration, decantation or centrifugation. In other operations, the reaction mixture may be cooled and treated with an excess of ether to precipitate the product, which may then be separated by such conventional procedures as filtration and decantation. In other operations, the reaction mixture may be fractionally distilled or evaporated under reduced pressure to remove the low boiling constituents and obtain the product as a solid residue. The product separated as described above may be employed in herbicidal, fungicidal or insecticidal applications or further purified by such conventional techniques as washing and recrystallization.

The following examples are illustrative of the present invention but are not to be construed as limiting the same.

EXAMPLE 1

1,6 - dimethyl - 3 - (3-methylphenyl)-5-phenyl-1,4,5,6-tetrahydro-as-triazine (3 grams; 0.012 mole) was dissolved in 50 milliliters of methanol and methyl iodide (3 milliliters; 0.048 mole) was added to the resulting solution. The mixture was heated to the boiling point and held under reflux for four hours. The mixture was concentrated by evaporation in vacuo. The residue was recrystallized from a mixture of ethanol, isopropanol and ether and recrystallized a second time from a mixture of isopropanol and ether. The 1,6 - dimethyl - 3 - (3-methylphenyl)-5 - phenyl - 1,4,5,6-tetrahydro-as-triazine methoiodide product was found to melt at 195°–196° C. with decomposition. The product was found by analysis to have carbon, hydrogen and iodine contents of 53.64, 5.80 and 30.51 percent, respectively, as compared with the theoretical contents of 54.16, 5.74 and 30.12 percent, respectively, calculated for the named structure.

In substantially the same procedure, the following triazine methohalide compounds were prepared.

1,6-dimethyl-3-(4-fluorophenyl)-5-phenyl-1,4,5,6 - tetrahydro-as-triazine methoiodide, melting at 212°–213° C. with decomposition, was prepared by mixing 1,6-dimethyl-3-(4-fluorophenyl)-5-phenyl-1,4,5,6 - tetrahydro-as-triazine with an excess of methyl iodide.

3-phenyl-1,4,5,6 - tetrahydro - 1,5,5-trimethyl-as-triazine methoiodide, melting at 181.5°–182.5° C. with decomposition, was prepared by mixing 3-phenyl-1,4,5,6-tetrahydro-1,5,5-trimethyl-as-triazine with an excess of methyl iodide.

3,5 - diphenyl-1-methyl - 1,4,5,6 - tetrahydro-as-triazine methoiodide, melting at 214°–215° C. with decomposition, was prepared by mixing 3,5-diphenyl-1-methyl-1,4,5,6-tetrahydro-as-triazine with an excess of methyl iodide.

EXAMPLE 2

1,3 - dimethyl - 5 - phenyl-1,4,5,6-tetrahydro-as-triazine (3.5 grams; 0.019 mole) was dissolved in 50 milliliters of acetone and methyl iodide (3.5 milliliters; 0.056 mole) was added to the resulting solution. The mixture was heated to the boiling point and held under reflux for four hours. The mixture was evaporated in vacuo and the residue was washed with a mixture of isopropanol and ether. The 1,3-dimethyl-5-phenyl-1,4,5,6-tetrahydro-as-triazine methoiodide product was found to melt at 239°–240° C. with decomposition. The structure of the product was confirmed by infrared spectroscopy.

In substantially the same procedure, the following triazine methohalide compounds were prepared.

1,6 - dimethyl - 3 - (4 - chlorophenyl)-5-phenyl-1,4,5,6-tetrahydro-as-triazine methoiodide, melting at 215°–216° C. with decomposition, was prepared by mixing 1,6-dimethyl-3-(4-chlorophenyl) - 5 - phenyl-1,4,5,6-tetrahydro-as-triazine with an excess of methyl iodide.

1,6-dimethyl-3-(4-methoxyphenyl) - 5 - phenyl-1,4,5,6-tetrahydro-as-triazine methoiodide, melting at 215°–217° C. with decomposition, was prepared by mixing 1,6-dimethyl-3-(4-methoxyphenyl) - 5 - phenyl - 1,4,5,6-tetrahydro-as-triazine with an excess of methyl iodide.

1,6-dimethyl - 3 - (4 - trifluoromethylphenyl)-5-phenyl-1,4,5,6 - tetrahydro-as-triazine methoiodide, melting at 211°–212° C. with decomposition, was prepared by mixing 1,6-dimethyl-3-(4-trifluoromethylphenyl) - 5 - phenyl-1,4,5,6-tetrahydro-as-triazine with an excess of methyl iodide.

EXAMPLE 3

1,6-dimethyl-3-(3-pyridyl)-5-phenyl - 1,4,5,6-tetrahydro-as-triazine (1.5 grams; 0.006 mole) was dissolved in a mixture of 25 milliliters of acetone and 25 milliliters of methanol, and methyl iodide (1.5 milliliters; 0.024 mole) was added to the resulting solution. The mixture was heated to the boiling point and held under reflux for four hours. The mixture was evaporated in vacuo and the residue was crystallized from a mixture of isopropanol and ether. The 1,6-dimethyl-3-(3-pyridyl) - 5 - phenyl-1,4,5,6-tetrahydro-as-triazine dimethoiodide product was found to melt at 230°–231° C. with decomposition. The structure of the product was confirmed by infrared spectroscopy.

In substantially the same procedure, 1,6-dimethyl-3-(3-pyridyl)-5-phenyl - 1,4,5,6-tetrahydro-as-triazine dimethobromide, having a molecular weight of 456.3, is prepared by mixing 1,6-dimethyl-3-(3-pyridyl) - 5 - phenyl-1,4,5,6-tetrahydro-as-triazine with an excess of methyl bromide.

EXAMPLE 4

1,3,5,5-tetramethyl - 1,4,5,6 - tetrahydro-as-triazine (1 gram; 0.007 mole) was dissolved in a mixture of 25 milliliters of acetone and 25 milliliters of methanol, and methyl iodide (1 milliliter; 0.016 mole) was added to the resulting solution. The mixture was heated to the boiling point and held under reflux for four hours after which it was evaporated in vacuo. The residue was washed with a mixture of isopropanol and ether. The 1,3,5,5-tetramethyl-1,4,5,6-tetrahydro-as-triazine methoiodide product was found to melt at 216°–217° C. The structure of the product was confirmed by infrared spectroscopy.

In substantially the same procedure, the following triazine methohalide compounds are prepared.

1,6-dimethyl-3-(4-fluorophenyl)-5-phenyl-1,4,5,6 - tetrahydro-as-triazine methobromide, having a molecular weight of 378.4, is prepared by mixing 1,6-dimethyl-3-(4-fluorophenyl)-5-phenyl-1,4,5,6-tetrahydro-as-triazine with an excess of methyl bromide.

1,6-dimethyl-3-(3 - methylphenyl) - 5 - phenyl - 1,4,5,6-tetrahydro-as-triazine methobromide, having a molecular weight of 374.5, is prepared by mixing 1,6-dimethyl-3-(3-methylphenyl)-5-phenyl-1,4,5,6-tetrahydro-as-triazine with an excess of methyl bromide.

1,3,5,5-tetramethyl-1,4,5,6-tetrahydro-as-triazine methobromide, having a molecular weight of 236.2, is prepared by mixing 1,3,5,5 - tetramethyl - 1,4,5,6 - tetrahydro-as-triazine with an excess of methyl bromide.

EXAMPLE 5

1,6-dimethyl-3-(4-methylphenyl) - 5 - phenyl - 1,4,5,6-tetrahydro-as-triazine (3 grams; 0.012 mole) was dissolved in a mixture of 25 milliliters of acetone and 25 milliliters of methanol, and methyl iodide (3 milliliters; 0.048 mole) was added to the resulting solution. The mixture was heated to the boiling point and held under reflux for four hours. The residue was recrystallized from a mixture of ethanol, isopropanol and ether and recrystallized a second time from a mixture of isopropanol and ether. The 1,6 - dimethyl-3-(4 - methylphenyl) - 5 - phenyl - 1,4,5,6-tetrahydro-as-triazine methoiodide product was found to melt at 205°–206° C. with decomposition. The structure of the product was confirmed by infrared spectroscopy.

In substantially the same procedure, 1,6-dimethyl-3-(4-methylphenyl)-5 - phenyl - 1,4,5,6 - tetrahydro-as-triazine methobromide, having a molecular weight of 374.5, is prepared by mixing 1,6-dimethyl-3-(4-methylphenyl)-5-phenyl-1,4,5,6-tetrahydro-as-triazine with an excess of methyl bromide.

The triazine methohalides of the present invention are employed as toxicants in herbicides to be employed for the control of various plants.

For such uses, the compounds can be employed in an unmodified form or dispersed on a finely divided solid and employed as dusts. Such mixtures can also be dispersed in water with or without the aid of a surface active agent and the resulting aqueous suspension employed as drenches or sprays. In other procedures, the products are employed as active constituents in solvent solutions, oil-in-water and water-in-oil emulsions or aqueous dispersions. The augmented compositions are adapted to be formulated as concentrates and subsequently diluted with additional liquid or solid adjuvants to produce the ultimate treating compositions.

In representative operations, separate aqueous compositions each containing one of the compounds, 1,6-dimethyl-3-(4 - fluorophenyl) - 5 - phenyl-1,4,5,6-tetrahydro-as-triazine methoidide, 3 - phenyl-1,4,5,6-tetrahydro-1,5,5 - trimethyl-as-triazine methoiodide, 3 - dimethyl-5-phenyl - 1,4,5,6 - tetrahydro-as-triazine methoiodide and 1,6-dimethyl - 5 - phenyl - 3 - (3-pyridyl)-1,4,5,6-tetrahydro-as-triazine dimethoiodide, as the sole toxicant therein and in an amount sufficient to provide a toxicant concentration equivalent to 50 pounds per acre when added to areas of soil containing viable seeds of corn gave substantially complete kills of corn. In other operations, separate liquid compositions each containing one of 1,4,5,6-tetrahydro - 1,3,5,5 - tetramethyl-as-triazine methoiodide and 1,6 - dimethyl - 5 - phenyl-1,4,5,6-tetrahydro-3-(4-trifluoromethylphenyl) - as - triazinemethoiodide as the sole toxicant therein and in an amount sufficient to provide a toxicant concentration equivalent to 50 pounds per acre when added to areas of soil containing viable seeds of peas gave substantially complete kills of the peas. In other operations, aqueous compositions containing 1,6-dimethyl - 3 - (4 - methylphenyl)-5-phenyl-1,4,5,6-tetrahydro-as-triazine methoiodide as the sole toxicant therein and in an amount sufficient to provide a toxicant concentration of 4,000 parts per million by weight gave substantially complete kills and controls of bean plants contacted therewith.

The compounds of the invention can also be employed as insecticides. In representatives operations, separate liquid compositions each containing one of 1,4,5,6-tetrahydro-1,3,5,5-tetramethyl - as - triazine methoiodide and 1,6-dimethyl-5-phenyl-3-(3-pyridyl)-1,4,5,6-tetrahydro-as-triazine dimethoiodide as the sole toxicant therein and in an amount sufficient to provide a toxicant concentration of 500 parts per million by weight gave substantially complete kills and controls of plum curculio contacted therewith.

What is claimed is:

1. A methohalide of a substituted 1,4,5,6-tetrahydro-as-triazine compound corresponding to the formula

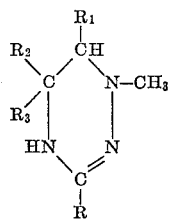

wherein R represents a member of the group consisting of alkyl groups containing from 1 to 4 carbon atoms, inclusive, pyridyl, phenyl and substituted phenyl, in which substituted phenyl refers to phenyl groups substituted with from 1 to 3 substituents selected from the group consisting of bromine, chlorine, fluorine, trifluoromethyl and lower alkyl and lower alkoxy groups containing from 1 to 4 carbon atoms, inclusive, $R_1$ and $R_2$ each independently represent a member of the group consisting of hydrogen and methyl and $R_3$ represents a member of the group consisting of hydrogen, methyl and phenyl.

2. The compound of claim 1 wherein the compound is 1,6-dimethyl-3-(4-methylphenyl)-5-phenyl-1,4,5,6-tetrahydro-as-triazine methoiodide.

References Cited

Trepanier: J. Medicinal Chem., vol. 9, pp. 881–5 (1966).

HENRY R. JILES, Primary Examiner

J. M. FORD, Assistant Examiner

U.S. Cl. X.R.

71—93; 260—999